United States Patent [19]

Lem

[11] Patent Number: 5,676,237
[45] Date of Patent: Oct. 14, 1997

[54] TRACKING DEVICE

[75] Inventor: Hans J. Lem, Franklin Lakes, N.J.

[73] Assignee: Quantum Conveyor Systems, Inc., Northvale, N.J.

[21] Appl. No.: 529,991

[22] Filed: Sep. 29, 1995

[51] Int. Cl.$^6$ ............................................. B65G 43/00
[52] U.S. Cl. ........................... 198/502.2; 198/502.1; 198/464.2
[58] Field of Search ...................... 198/460.1, 464.2, 198/502.1, 502.2, 781.06

[56] References Cited

U.S. PATENT DOCUMENTS

| | | | |
|---|---|---|---|
| 3,239,216 | 3/1966 | Pfleger | 198/464.2 |
| 3,680,692 | 8/1972 | Southworth | 198/502.2 |
| 3,756,370 | 9/1973 | Ingram | 198/502.1 |
| 4,154,995 | 5/1979 | Kantarian et al. | 198/502.1 |
| 4,511,030 | 4/1985 | Lem . | |
| 4,696,386 | 9/1987 | Lem . | |

FOREIGN PATENT DOCUMENTS 2716625  10/1978  Germany ............................ 198/502.2

*Primary Examiner*—Joseph E. Valenza
*Attorney, Agent, or Firm*—Henry D. Pahl, Jr.

[57] ABSTRACT

The tracking signal generating device disclosed herein is adapted to be utilized between successive conveying sections in which articles are transported at a nominal height. A resilient suspension supports an elongate roller so that it projects above the nominal height of the conveying sections in the absence of an article being transported, but is deflected downwardly by the passage of an article from one section to the next. A sensor responsive to the downward deflection provides a signal indicating the presence of an article and an encoder driven by rotation of the roller generates signals indicating the length of an article passing the device.

2 Claims, 1 Drawing Sheet

TRACKING DEVICE

BACKGROUND OF THE INVENTION

The present invention relates to conveyer systems and more particularly to a modular conveyor system which includes apparatus for tracking articles as they pass from one conveyor section to another.

Increasingly, modern conveyor systems are operated under computer control. Further, instead of only moving articles along a predetermined path at fixed speed, modern conveyor systems often include means for diverting articles from one path to another and for temporarily holding or accumulated articles for subsequent release in to further transport. A preferred type of accumulating conveyor system is described in the U.S. Pat. No. 4,511,030, issued on Apr. 16, 1985 to Hans Lem.

As is understood by those skilled in the art, articles being conveyed do not always proceed in exactly predictable fashion since there may in fact be slippage, momentary failure to transfer from one section to another, or delay or binding in traversing a turn or in being diverted. Accordingly, there is a perceived need for tracking articles as they are conveyed. While various tracking systems are known in the prior art, e.g., those which utilize bar code readers or photo eye sensors at multiple locations, such systems are relatively expensive and complicated and are not economically feasible for relatively basic article conveying systems.

Among the several objects of the present invention may be noted the provision of apparatus which facilitates the tracking of articles being transported on a conveyor system; the provision of such apparatus which facilitates the design of modular conveyor systems; the provision of such a system of which signals the passing of an article between sections of a conveyor; the provision of such apparatus which provides information indicative of the length of the article traversing a junction between conveyor sections; the provision of such apparatus which is highly reliable, which is easily installed and which is of relatively simple and an inexpensive construction. Other objects and features will be in part apparent and in part pointed out hereinafter.

SUMMARY OF THE INVENTION

Briefly, the apparatus of the present invention employs an elongate roller having an axle journaled in bearings. The bearings are in turn supported in a resilient suspension. The suspension resiliently maintains the height of the roller somewhat above the nominal height of articles being transported along successive conveying sections so that the roller, axle and bearings are deflected downwardly by the passage of an article from one section to the other. A sensor responsive to the downward deflection provides a signal indicative of the presence of the article and an encoder driven by rotation of the roller generates signals indicating the length of an article passing the device.

BRIEF DESCRIPTION OF THE DRAWINGS

Corresponding reference characters indicate corresponding parts throughout the several views of the drawing.

DESCRIPTION OF THE PREFERED EMBODIMENTS

Figure 1:
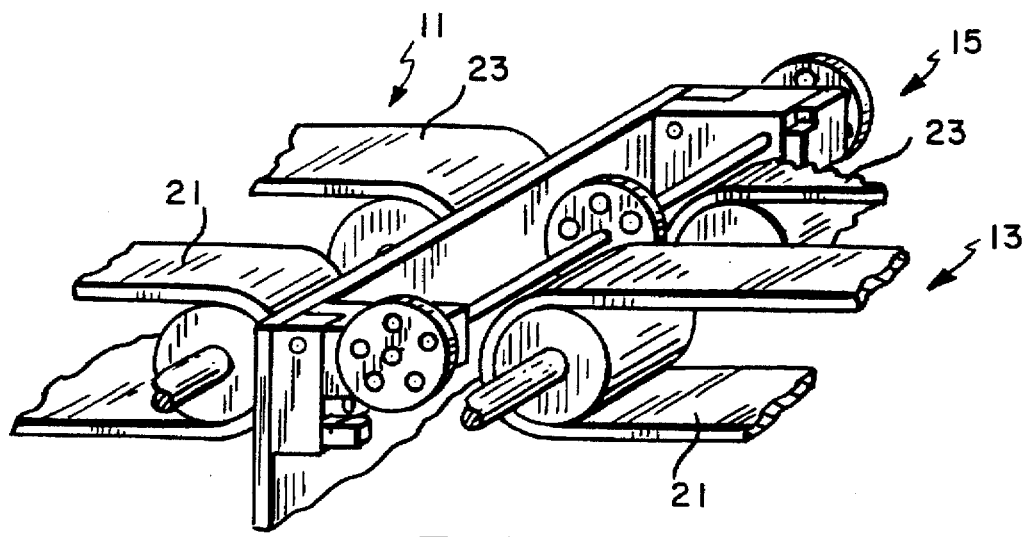
FIG. 1 is a drawing in perspective, illustrating a pair of conveying sections with a tracking device in accordance with the present invention located at a juncture between the sections.

Referring now to FIG. 1, the conveyor system illustrated there includes two conveying sections, designated generally by reference characters 11 and 13 with a tracking device 15 mounted at the juncture between the conveying sections. In most conveyor applications, the articles being transported are either boxed or placed in bins so that the footprint of the article is essentially rectangular and is of roughly known length. For ease in description, the articles being transported are referred to hereinafter as packages, but it will be understood that appropriate articles of various types may be transported.

As indicated previously, the conveying sections 11 and 13 may be of the type by described in U.S. Pat. No. 4,511,030, which employs a plurality of moving belts 21 and 23 interleaved between pneumatically actuated lifting sections. When pneumatic bladders under the lifting sections are inflated, the lifting sections rise and lift any articles on the conveyor section off the moving belts so that they can be selectively stopped, even though the belts continue moving. Instead of passing over rollers, the belts could, alternatively, pass over the tracking device 15 continuing from one section to the next.

Figure 2:
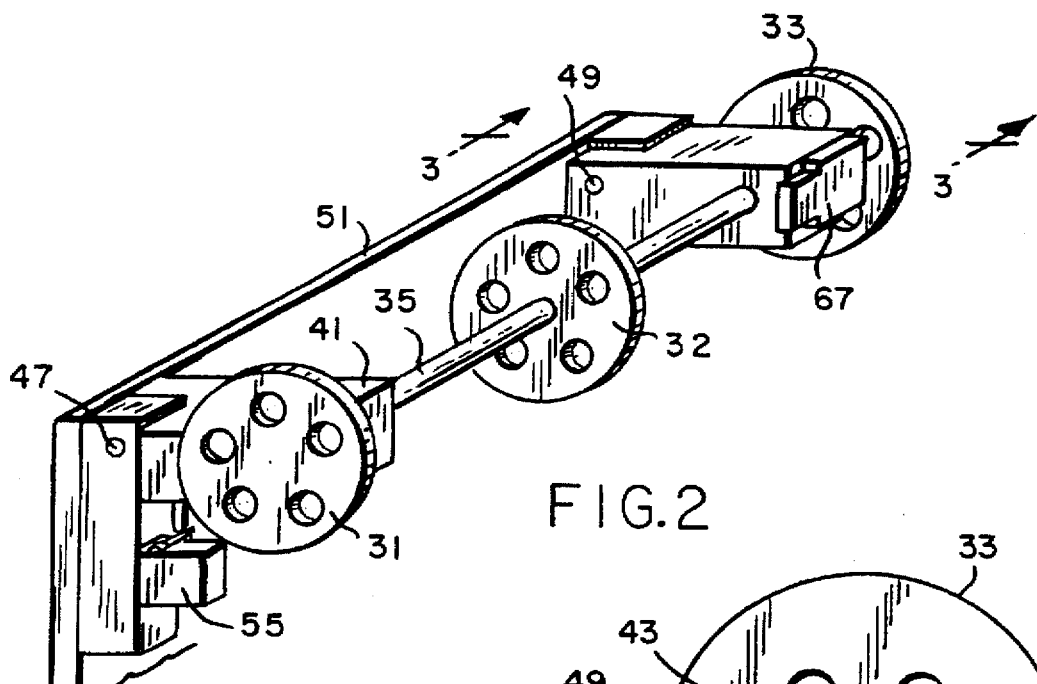
FIG. 2 is a perspective view of the tracking device.
Figure 3:
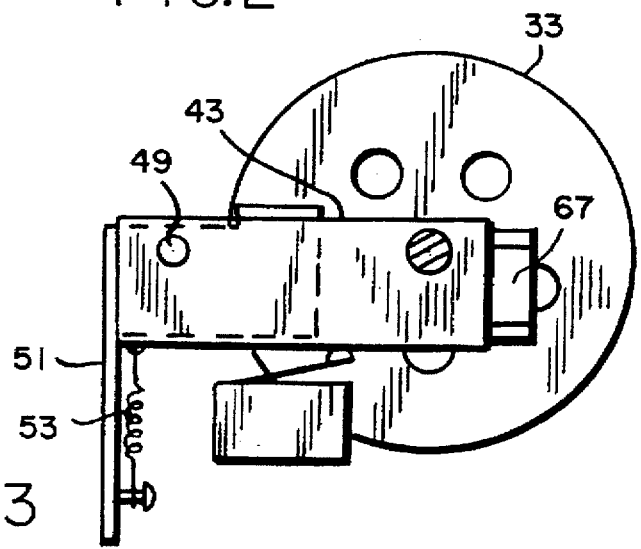
FIG. 3 is a view in section of the tracking device, taken substantially on the line 3—3 of FIG. 2.

Referring now to FIGS. 2 and 3, the tracking device 15 employs an aligned series of rollers or wheels 31–33 mounted on an axle 35. While the particular roller arrangement shown is segmented into wheels, it should be understood that a continuously elongate roller might be employed in some applications. The roller axle 35 is journaled in bearing blocks 41 and 43, which are pivotable around pins 47 and 49 mounted on a frame 51. The bearing blocks are resiliently biased by means of springs 53 so that, in the absence of an article being transported, the rollers project above the nominal conveyor height, i.e. the height at which the bottoms of the packages being conveyed are supported. Accordingly, an article passing from the first conveyor section 11 to the next conveyor section 13 will cause the rollers, the axle and the bearing block to be deflected downwardly. Downward deflection of the bearing block 41 is detected by a microswitch 55, which operates as a sensor to provide a signal indicating the presence of an article at the juncture between the two conveyor sections. Other types of sensors, e.g. magnetic proximity sensors or optical sensors, might also be used.

The rollers 31–33 are apertured as illustrated and are constructed of a light-colored plastic. An opto-electronic module 67 comprising both a light source and a photodetector is directed at the side of roller 33 and operates as an encoder driven by rotation of the rollers to generate a pulsating signal indicative of the length of the package passing the tracking device. Preferably, the spacing of the apertures in the wheel 33 corresponds to a convenient unit of package movement, e.g. one inch. As will be understood, the rotation responsive signal could also be derived from other types of sensors such as reed relays, Hall-effect sensors, etc.

As will be understood by those in the control arts, having signals available representing both the presence of an article at the juncture between conveyor sections and additional signals indicative of the length of an article passing the juncture will be sufficient to selectively enable many directing, sorting, and merging operations.

Information representing the length of package which is passing the tracking device is particularly useful for spacing or separating packages which have been accumulated on the incoming conveyor section 11 in closely adjacent or contacting configuration. If a package of known length is brought up to the juncture, the incoming conveying section 11 can be advanced until an advancing motion equal to the length of the package has been accomplished and, then, the lifting mechanism for the incoming belt 11 can be actuated and the outgoing conveyor operated so as to advance the lead package before releasing or advancing the next package in the accumulated group.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a conveyor system in which articles are transported along successive conveying sections at a nominal height, a tracking signal generating device comprising:

an aligned series of roller wheels;

an axle mounting said roller wheels for rotation;

bearings in which said axle is journaled;

spring means resiliently supporting said bearings between a pair of successive conveying sections with said roller projecting above said nominal height in the absence of an article being transported, said roller axle and bearings being deflected downwardly by the passage of an article from one of said pair of sections to the other;

a switch actuable by said downward deflection for providing a signal indicating the presence of an article passing between said sections; and an opto-electronic encoder actuated by rotation of said roller for generating a pulse signal indicating the length of an article passing said device.

2. A tracking device as set forth in claim 1 wherein said bearings are pivotally mounted on a frame and said spring means biases said bearing for rotation around the pivot axis.

* * * * *